United States Patent
Byun et al.

(10) Patent No.: US 9,431,646 B2
(45) Date of Patent: Aug. 30, 2016

(54) RECHARGEABLE BATTERY HAVING CONNECTION MEMBER

(71) Applicant: SAMSUNG SDI CO., LTD., Yongin-si, Gyeonggi-do (KR)

(72) Inventors: Sang-Won Byun, Yongin-si (KR); Jeong-Won Oh, Yongin-si (KR); Young-Sik Moon, Yongin-si (KR); Sang-Kyoon Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 119 days.

(21) Appl. No.: 14/253,823

(22) Filed: Apr. 15, 2014

(65) Prior Publication Data

US 2015/0099149 A1    Apr. 9, 2015

(30) Foreign Application Priority Data

Oct. 8, 2013 (KR) .................. 10-2013-0120119

(51) Int. Cl.
*H01M 2/34* (2006.01)

(52) U.S. Cl.
CPC ....... *H01M 2/345* (2013.01); *H01M 2200/103* (2013.01); *H01M 2200/20* (2013.01)

(58) Field of Classification Search
CPC .................. H01M 2200/103; H01M 2200/20; H01M 2/345
See application file for complete search history.

(56) References Cited

U.S. PATENT DOCUMENTS

| | | | | |
|---|---|---|---|---|
| 3,373,057 | A | * | 3/1968 | Jost ................ H01M 2/345 429/58 |
| 2009/0297891 | A1 | | 12/2009 | Byun et al. |
| 2010/0167107 | A1 | * | 7/2010 | Byun ............... H01M 2/1229 429/56 |
| 2011/0052949 | A1 | * | 3/2011 | Byun ............... H01M 2/043 429/61 |
| 2011/0135976 | A1 | * | 6/2011 | Byun ............... H01M 2/04 429/56 |
| 2011/0244280 | A1 | * | 10/2011 | Byun ............... H01M 2/0404 429/61 |
| 2012/0237802 | A1 | * | 9/2012 | Byun ............... H01M 2/043 429/53 |

FOREIGN PATENT DOCUMENTS

| | | |
|---|---|---|
| KR | 2000-0014670 | 3/2000 |
| KR | 10-2009-0126096 | 12/2009 |
| KR | 10-1023104 B1 | 3/2011 |
| KR | 10-2011-0065277 | 6/2011 |
| KR | 10-1130294 B1 | 3/2012 |

OTHER PUBLICATIONS

KIPO Office action dated Jul. 6, 2016, with English translation, for Korean priority Patent application 10-2013-0120119, (19 pages).

\* cited by examiner

*Primary Examiner* — Carlos Barcena

(74) *Attorney, Agent, or Firm* — Lewis Roca Rothgerber Christie LLP

(57) ABSTRACT

A rechargeable battery includes: an electrode assembly including a first electrode and a second electrode; a case accommodating the electrode assembly; a cap plate coupled to the case; and a connection member electrically connecting the first electrode and the cap plate, wherein the connection member is configured to be deformed to electrically disconnect the first electrode and the cap plate.

15 Claims, 9 Drawing Sheets

RECHARGEABLE BATTERY HAVING CONNECTION MEMBER

CROSS-REFERENCE TO RELATED APPLICATIONS

This application claims priority to and the benefit of Korean Patent Application No. 10-2013-0120119 filed in the Korean Intellectual Property Office on Oct. 8, 2013, the entire contents of which are incorporated herein by reference.

BACKGROUND

1. Field

The described technology relates generally to a rechargeable battery.

2. Description of the Related Art

A rechargeable battery differs from a primary battery in that it can be repeatedly charged and discharged, while the latter is incapable of being recharged.

A low-capacity rechargeable battery is used in small portable electronic devices such as mobile phones, notebook computers, and camcorders, while a high-capacity rechargeable battery is widely used as a power source for driving a motor of a hybrid vehicle or the like.

Recently, a high power rechargeable battery using a non-aqueous electrolyte and having high energy density has been developed, and such high power rechargeable battery is typically formed by coupling a plurality of rechargeable batteries in series to be used as a power source for driving a motor of a device requiring a large amount of electric power, for example, an electric vehicle or the like.

A high-capacity rechargeable battery typically includes a plurality of rechargeable batteries connected in series, and each rechargeable battery may be formed in a cylindrical or prismatic shape.

When internal pressure of the rechargeable battery, accommodated in its case made of metal or the like, is increased due to an abnormal reaction, the rechargeable battery may explode or catch fire.

The above information disclosed in this Background section is only for enhancement of understanding of the background of the described technology and therefore it may contain information that is not prior art that is already known in this country to a person of ordinary skill in the art.

SUMMARY

Embodiments of the present invention provide a rechargeable battery with improved safety.

According to one or more aspects of embodiments of the present invention, a rechargeable battery includes: an electrode assembly including a first electrode and a second electrode; a case accommodating the electrode assembly; a cap plate coupled to the case; and a connection member electrically connecting the first electrode and the cap plate, wherein the connection member is configured to sever an electrical connection between the first electrode and the cap plate.

In one embodiment, a first current collecting member is bonded to the first electrode, and the connection member may be electrically connected to the first electrode through the first current collecting member, and the first current collecting member may include an electrode bonding portion bonded to the first electrode and an upper bonding portion connected to the electrode bonding portion and bonded to the connection member.

The first current collecting member may have a fuse hole, and the cap plate may be formed with a connection hole, and the connection member may be located between the connection hole and the first current collecting member.

In some embodiments, a stepped portion is formed at an edge of the connection hole, and the connection member may include an edge portion inserted into the stepped portion and a variable portion central to the edge portion, convexly curved towards the current collecting member and bonded to the current collecting member.

In one embodiment, the variable portion includes a supporting protrusion, which may be bonded to the current collecting member, and the current collecting member may be formed with a supporting hole in which the supporting protrusion is accommodated by an interference fit.

In one embodiment, the supporting protrusion penetrates the supporting hole. A supporting plate may be welded to an edge portion of the supporting protrusion, and the supporting plate may include a notch elongated in a circumferential direction of the supporting hole.

In one embodiment, a first terminal is electrically connected to the cap plate, and the first terminal covers the connection hole.

In one embodiment, a first lower insulation member is located between the cap plate and the first current collecting member, and the first lower insulation member may include a connecting hole in which the connection member is configured to be inserted.

A supporting step may be formed in the first lower insulation member. The cap plate may further include a supporting member, a second terminal electrically connected to the second electrode through the supporting member, and an upper insulation member between the supporting member and the cap plate.

A second current collecting member may be connected to the second electrode and may be bonded by welding to the bottom side of the supporting member, and the second current collecting member may have a fuse hole.

In one embodiment, a second lower insulation member for enclosing the fuse hole may be provided.

According to an exemplary embodiment, as internal pressure of the rechargeable battery is increased, the connection member is deformed to cut off electrical connections inside the rechargeable battery, thereby resulting in improved safety.

DETAILED DESCRIPTION

Figure 1:
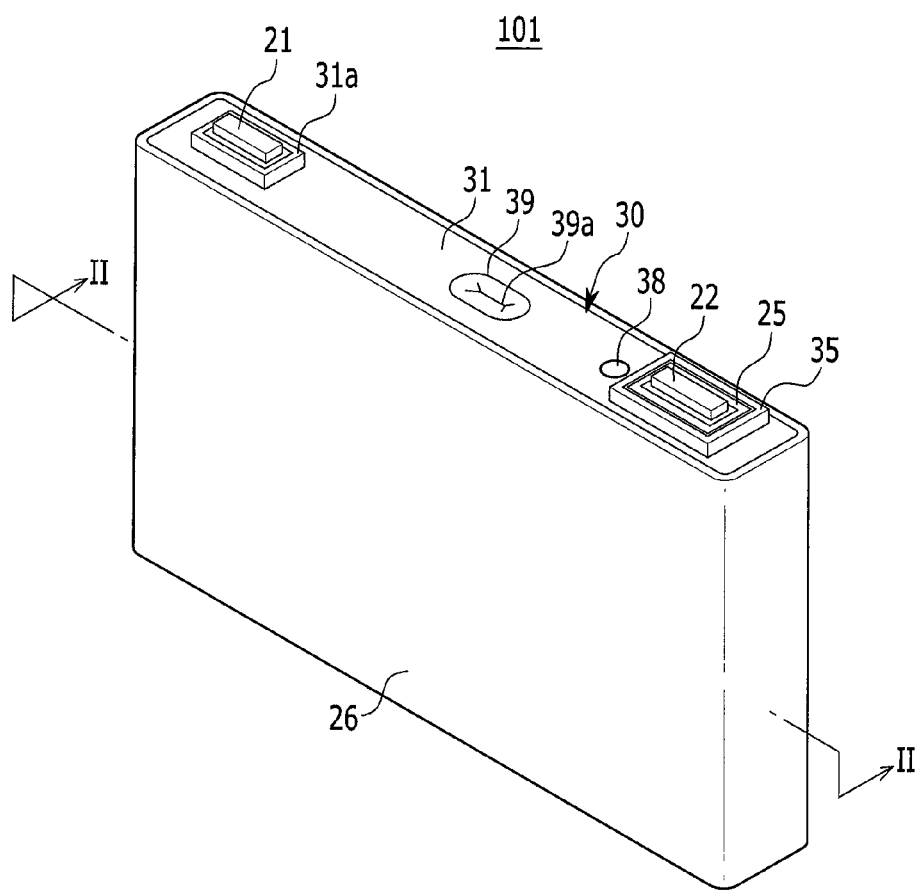
FIG. 1 is a perspective view of a rechargeable battery according to a first exemplary embodiment of the present invention

The present invention will be described more fully hereinafter with reference to the accompanying drawings, in which exemplary embodiments of the present invention are shown.

As those skilled in the art would realize, the described embodiments may be modified in various different ways, all without departing from the spirit or scope of the present invention.

Like reference numerals designate like elements throughout the specification and drawings. The use of "may" when describing embodiments of the present invention refers to "one or more embodiments of the present invention."

Figure 2:
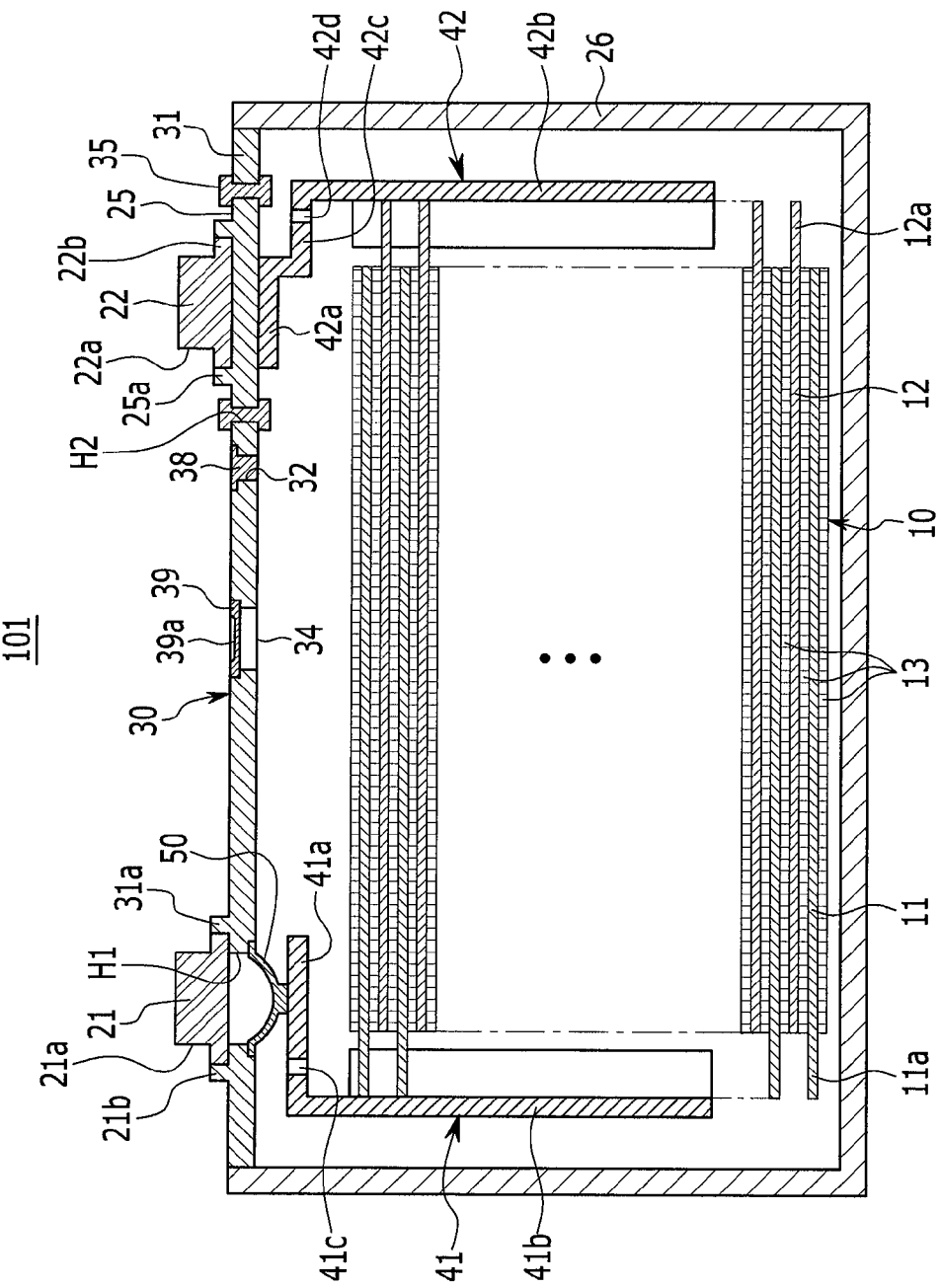
FIG. 2 is a vertical cross-sectional view of FIG. 1, taken along the line II-II.

FIG. 1 is a perspective view of a rechargeable battery according to a first exemplary embodiment of the present invention, and FIG. 2 is a vertical cross-sectional view of FIG. 1, taken along the line II-II.

Referring to FIG. 1 and FIG. 2, the rechargeable battery 101 according to the first exemplary embodiment of the present invention includes: an electrode assembly 10 wound by inserting a separator 13 between a positive electrode (first electrode) 11 and a negative electrode (second electrode) 12; a case 26 in which the electrode assembly 10 is accommodated; and a cap assembly 30 coupled to an opening of the case 26.

The rechargeable battery 101 according to the first exemplary embodiment is exemplarily illustrated as a prism-shaped lithium ion rechargeable battery.

However, the present invention is not limited thereto, and it can be applied to various types of batteries such as a lithium polymer battery or the like.

The positive electrode 11 and the negative electrode 12 include coated regions where an active material is coated on a current collector formed of a thin metal foil, and uncoated regions 11a and 12a where an active material is not coated.

The positive electrode uncoated region 11a is formed at one lateral end of the positive electrode 11 along a lengthwise direction of the positive electrode 11, while the negative electrode uncoated region 12a is formed at a lateral end of the negative electrode 12 opposite to the positive uncoated region 11a along a lengthwise direction of the negative electrode 12.

The positive electrode 11 and the negative electrode 12 are wound by inserting the separator 13, which operates as an insulator, between them.

However, the present invention is not limited thereto, and the electrode assembly 10 may be formed in a layered structure in which the positive electrode and the negative electrode, respectively formed of a plurality of sheets, are layered by inserting the separator between them.

The case 26 is roughly formed in a cuboid shape, and the opening is formed at one side.

The case 26 may be made of a metal such as aluminum, stainless steel, or the like.

In one embodiment, the cap assembly 30 includes a cap plate 31 covering the opening of the case 26, a first terminal 21 protruding out of the cap plate 31 and electrically connected to the positive electrode 11, and a second terminal 22 protruding out of the cap plate 31 and electrically connected to the negative electrode 12.

The cap plate 31 is formed in a rectangular plate shape elongated in one direction, and is combined to the case 26 at the case opening.

The cap plate 31 includes a sealing cap 38 provided in an electrolyte injection opening 32, and a vent plate 39 provided in a vent hole 34 and formed with a notch 39a configured to be opened at a predetermined pressure.

In one embodiment, the first and second terminals 21 and 22 protrude above the cap plate 31.

The first terminal 21 is electrically connected to the positive electrode 11 through a first current collecting member 41, and the second terminal 22 is electrically connected to the negative electrode 12 through a second current collecting member 42.

However, the present invention is not limited thereto, and the first terminal 21 may be electrically connected to the negative electrode while the second terminal 22 may be electrically connected to the positive electrode.

In some embodiments, the first terminal 21 includes a flange portion 21b supported by the cap plate 31, and a protruding portion 21a, which protrudes from the flange portion 21b.

The flange portion 21b is formed to protrude outwards from a lower end of the protruding portion 21a along a lengthwise direction of the electrode assembly, and the protruding portion 21a and the flange portion 21b respectively have a rectangular cross-section.

The cap plate 31 is formed with a mounting protrusion 31a, which protrudes from the cap plate 31 in a quadrangle ring shape, and the flange portion 21b is inserted into the mounting protrusion 31a and is fixed thereto by welding.

In some embodiments, the cap plate 31 is formed with a connection hole H1, and the first terminal 21 is positioned above the connection hole H1 and covers the connection hole H1.

The cap plate 31 is provided with a connection member 50, and the connection member 50 is bonded to the first current collecting member 41.

The first current collecting member 41 includes an upper bonding portion 41a bonded to the connection member 50, and an electrode bonding portion 41b bent substantially perpendicularly from the upper bonding portion 41a toward the bottom of the case 26 and bonded to the positive electrode uncoated region 11a.

The upper bonding portion 41a is formed with a fuse hole 41c, and the fuse hole 41c has a smaller cross-sectional area than the part of the upper bonding portion 41a without the fuse hole 41c.

The periphery region of the fuse hole 41c is configured to melt when an overcurrent flows due to a short-circuit or the like, and serves to cut off the current.

The second terminal 22 includes a flange portion 22b and a protruding portion 22a protruding upwards from the flange portion 22b.

The flange portion 22b is formed to protrude outwards from a lower end of the protruding portion 22a along a lengthwise direction of the electrode assembly, and the protruding portion 22a and the flange portion 22b respectively have a rectangular cross-section.

The cap plate 31 is formed with a terminal hole H2, and a supporting member 25 is inserted into the terminal hole H2 along with upper insulation members 35.

The upper insulation members 35 are formed by insert molding after the supporting member 25 is inserted into the terminal hole H2.

The upper insulation members 35 not only insulate the supporting member 25 from the cap plate 31, but also seal the space between the supporting member 25 and the cap plate 31.

In some embodiments, the supporting member 25 is formed with a mounting protrusion 25a protruding upwards, and the mounting protrusion 25a is formed in a quadrangular ring shape.

The flange portion 22b is inserted into the mounting protrusion 25a and is fixed thereto by welding.

The supporting member 25 is electrically connected to the negative electrode 12 through the second current collecting member 42.

The second current collecting member 42 includes an upper bonding portion 42a bonded to the supporting member 25, and an electrode bonding portion 42b bonded to the negative electrode uncoated region 12a.

In one embodiment, an intermediate connecting portion 42c is formed between the upper bonding portion 42a and the electrode bonding portion 42b.

The intermediate connecting portion 42c is formed to be bent from both the upper bonding portion 42a and the electrode bonding portion 42b, and the intermediate connecting portion 42c is formed with a fuse hole 42d.

Similar to the first current collecting member 41, the fuse hole 42d has a smaller cross-sectional area than the part of the intermediate connecting portion 42c without the fuse hole 42d.

The periphery region of the fuse hole 42d is configured to melt when an overcurrent flows due to a short-circuit or the like, and serves to cut off the current.

Figure 3:
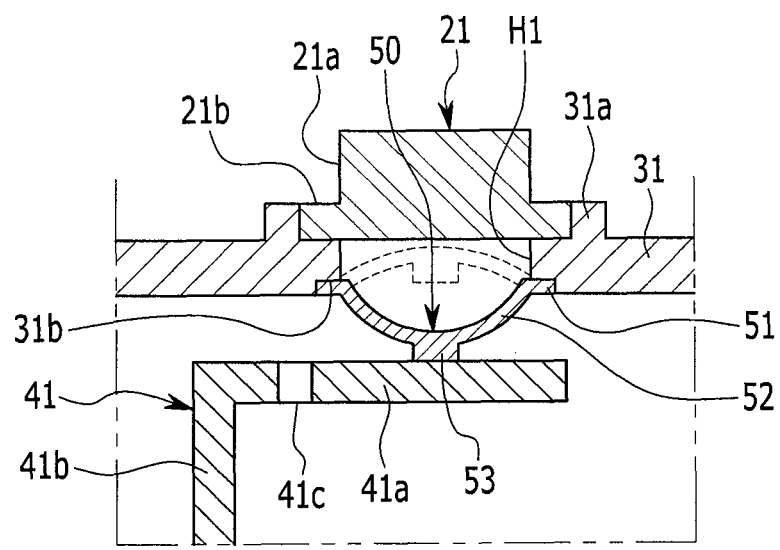
FIG. 3 is a vertical cross-sectional view of a part of the rechargeable battery according to the first exemplary embodiment of the present invention.
Figure 4:
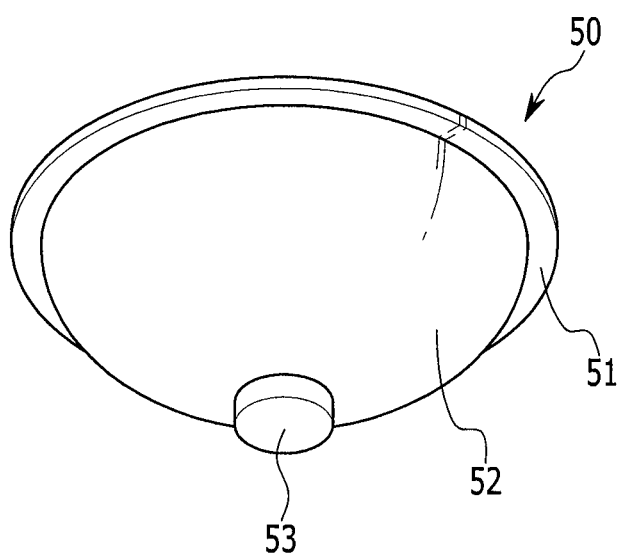
FIG. 4 is a perspective view of a connection member according to the first exemplary embodiment of the present invention.

FIG. 3 is a vertical cross-sectional view of a part of the rechargeable battery according to the first exemplary embodiment of the present invention, and FIG. 4 is a perspective view of the connection member according to the first exemplary embodiment of the present invention.

Referring to FIG. 3 and FIG. 4, the connection member 50 includes an edge portion 51 inserted into a stepped portion 31b of the cap plate 31, and a variable portion 52 formed inwards from the edge portion 51 and convexly protruding toward the first current collecting member 41.

The edge portion 51 is formed in a circular ring shape, and the variable portion 52 is curved to have an arc-shaped cross-section.

The edge portion 51 and the variable portion 52 are generally formed as a plate.

The edge portion 51 is fixed to the stepped portion 31b by welding and is electrically connected to the cap plate 31, and the variable portion 52 is bonded to the first current collecting member 41 by welding.

The variable portion 52 includes a supporting protrusion 53, which protrudes towards the first current collecting member 41 and is bonded by welding to the first current collecting member 41.

The supporting protrusion 53 is formed as a cylindrical pillar protruding downwards toward the first current collecting member 41.

Accordingly, the connection member 50 electrically connects the first current collecting member 41 and the cap plate 31.

In some embodiments, internal pressure of the rechargeable battery 101 is increased when gas is generated inside the case 26. When the internal pressure exceeds a predetermined level, the variable portion 52 is inversely deformed to be convexly curved towards the first terminal 21.

In this instance, the variable portion 52 and the first current collecting member 41 are separated from each other, and the first current collecting member 41 moves down to be further separated from the variable portion 52.

If the internal pressure of the rechargeable battery 101 is below a predetermined level and if the bonding between the variable portion 52 and the first current collecting member 41 is favorably maintained with the help of welding, the variable portion 52 supports the first current collecting member 41 and prevents it from moving down.

However, when the variable portion 52 is inversely deformed due to excessive internal pressure, the bonding with the first current collecting portion 41 is ruptured, and the first current collecting member 41 moves down because it is no longer supported from above.

When the variable portion 52 is separated from the first current collecting member 41, an arc is likely to be generated.

However, in the present exemplary embodiment, if the variable portion 52 is inversely deformed upwards and the first current collecting member 41 moves down at the same time, generation of the arc may be eliminated or decreased as distance between the variable portion 52 and the first current collecting member 41 is further increased.

In the embodiments where the respective periphery regions of the fuse hole 41c or 42d of the first or second current collecting member 41 or 42 respectively are melted due to internal or external short-circuit, an arc and gas inside the rechargeable battery 101 may be generated.

In one embodiment, the connection member 50 is deformed due to impact of arc generation or pressure increase caused by gas generation.

When the connection member 50 is deformed, the short-circuit is eliminated as the current flow is cut off.

Accordingly, a secondary arc may be prevented after melting of the periphery regions of the fuse holes 41c and 42d.

Figure 5:
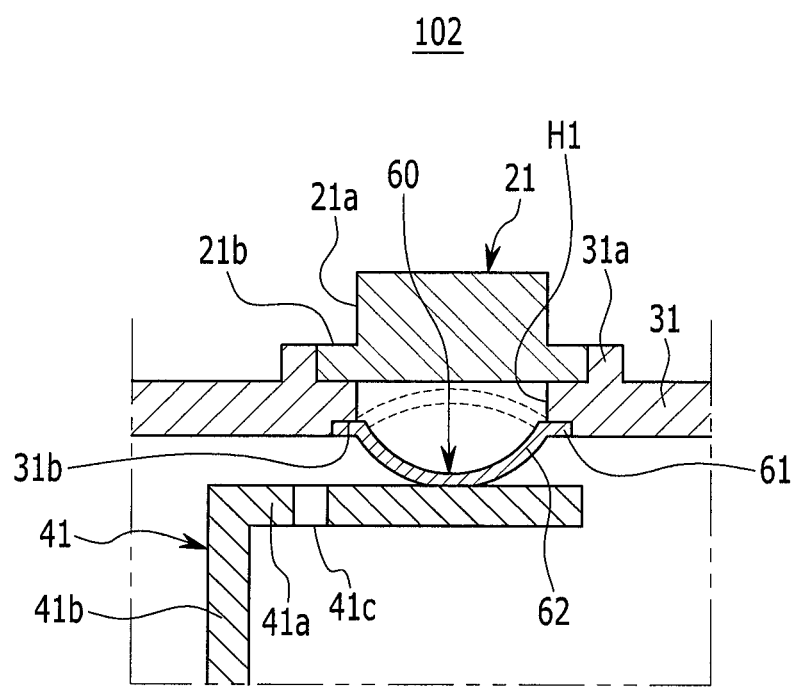
FIG. 5 is a vertical cross-sectional view of a part of a rechargeable battery according to a second exemplary embodiment of the present invention.

FIG. 5 is a vertical cross-sectional view of a part of a rechargeable battery according to a second exemplary embodiment of the present invention.

Referring to FIG. 5, since the rechargeable battery 102 according to the present exemplary embodiment has the same structure as the rechargeable battery according to the first exemplary embodiment, except for the structure of a connection member 60, a repeated description of the same structure will not be provided again.

According to the second exemplary embodiment, the connection member 60 includes an edge portion 61 inserted into the stepped portion 31b of the cap plate 31, and a variable portion 62 formed inwards from the edge portion 61 and convexly protruding toward the first current collecting member 41.

The edge portion 61 is formed in a circular ring shape, and the variable portion 62 is curved to have an arc-shaped cross-section.

The edge portion 61 and the variable portion 62 are generally formed as a plate.

The edge portion 61 is fixed to the stepped portion 31b by welding and is electrically connected to the cap plate 31 by welding, and the variable portion 62 is bonded to the first current collecting member 41 by welding.

Unlike the first exemplary embodiment, the variable portion 62 is not formed with a protrusion, and a lower end of the curved portion of the variable portion 62 is directly bonded to the first current collecting member 41 by welding.

Figure 6:
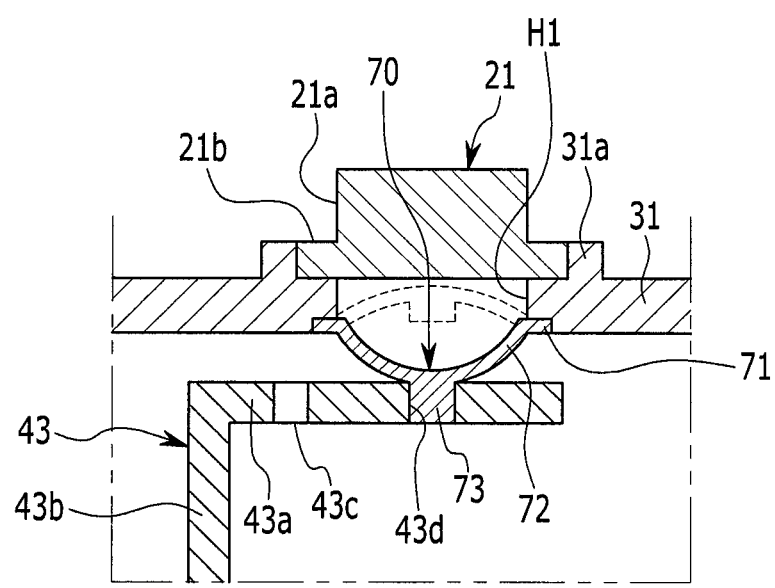
FIG. 6 is a vertical cross-sectional view of a part of a rechargeable battery according to a third exemplary embodiment of the present invention.

FIG. 6 is a vertical cross-sectional view of a part of a rechargeable battery according to a third exemplary embodiment of the present invention.

Referring to FIG. 6, since the rechargeable battery 103 according to the present exemplary embodiment has the same structure as the rechargeable battery according to the first exemplary embodiment, except for the structure of a connection member 70 and a first current collecting member 43, a repeated description of the same structure will not be provided again.

The connection member 70 includes an edge portion 71 inserted into the stepped portion 31b of the cap plate 31, and a variable portion 72 formed inwards from the edge portion 71 and convexly protruding toward the first current collecting member 43.

The edge 71 portion is formed in a circular ring shape, and the variable portion 72 is curved to have an arc-shaped cross-section.

The edge portion 71 and the variable portion 72 are generally formed as a plate.

The edge portion 71 is fixed to the stepped portion 31b by welding and is electrically connected to the cap plate 31, and the variable portion 72 is bonded to the first current collecting member 43 by welding.

The variable portion 72 includes a supporting protrusion 73, which protrudes towards the first current collecting member 43 and is inserted into a supporting hole 43d formed in the first current collecting member 43.

The first current colleting member 43 includes an upper bonding portion 43a bonded to the connection member 70, and an electrode bonding portion 43b bent substantially perpendicularly from the upper bonding portion 43a toward the bottom of the case 26 and bonded to the positive electrode uncoated region 11a.

The upper bonding portion 43a is formed with a fuse hole 43c and the supporting hole 43d.

The fuse hole 43c and the supporting hole 43d are positioned apart from each other, and the fuse hole 43c is located at an outer side of the upper bonding portion 43a (based on the center of the case 26) when compared to the location of the supporting hole 43d.

The supporting protrusion 73 is fitted into the supporting hole 43d to support the first current collecting member 43. A lower end of the supporting protrusion 73 may be bonded to the first current collecting member 43 by welding. In one embodiment, the supporting protrusion 73 is forced to be fitted into the supporting hole 43d, and may be bonded without being welded.

When the supporting protrusion 73 according to the present exemplary embodiment is fitted into the supporting hole 43d, the connection member 70 more stably supports the first current collecting member 43, and contact failure between the connection member 70 and the first current collecting member 43 due to external impacts or vibrations may be prevented.

A deformation pressure of the connection member 70 is dependent on welding strength or bond strength between the supporting protrusion 73 and the supporting hole 43d.

When internal pressure of the rechargeable battery 103 is increased, the connection member 70 is inversely deformed to be separated from the first current collecting member 43.

Figure 7:
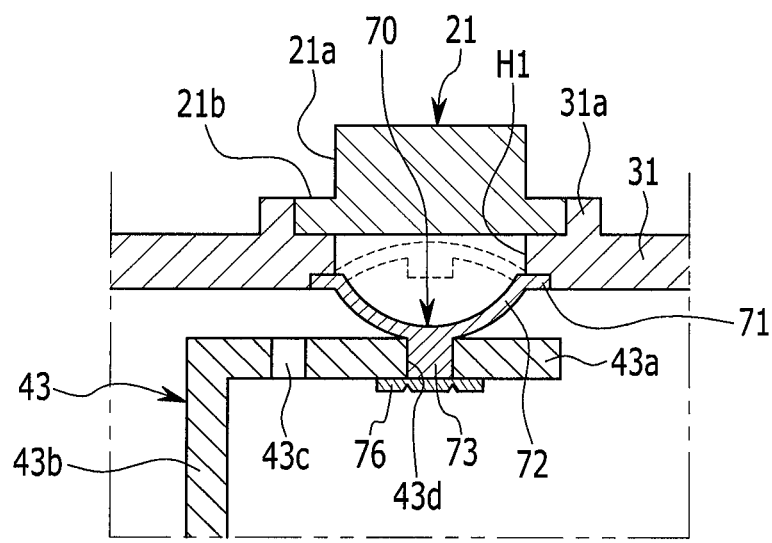
FIG. 7 is a vertical cross-sectional view of a part of a rechargeable battery according to a fourth exemplary embodiment of the present invention.
Figure 8:
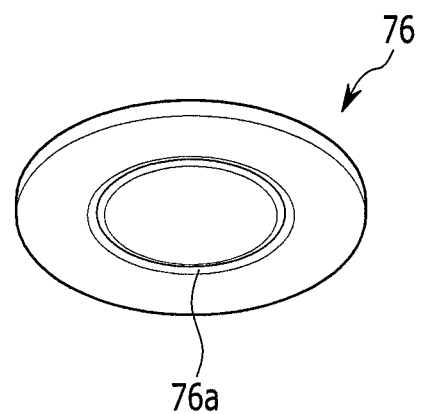
FIG. 8 is a perspective view of a supporting plate, viewed from the bottom, according to the fourth exemplary embodiment of the present invention.

FIG. 7 is a vertical cross-sectional view of a part of a rechargeable battery according to a fourth exemplary embodiment of the present invention, and FIG. 8 is a perspective view of a supporting plate, viewed from the bottom, according to a fourth exemplary embodiment of the present invention.

Referring to FIG. 7 and FIG. 8, since the rechargeable battery 104 according to the present exemplary embodiment has the same structure as the rechargeable battery according to the third exemplary embodiment, except for installation of a supporting plate 76, a repeated description of the same structure will not be provided again.

The connection member 70 includes the edge portion 71 inserted into the stepped portion 31b of the cap plate 31, and the variable portion 72 formed inwards from the edge portion 71 and convexly protruding toward the first current collecting member 43.

The edge portion 71 is formed in a circular ring shape, and the variable portion 72 is curved to have an arc-shaped cross-section.

The edge portion 71 and the variable portion 72 are formed in a plate shape.

The edge portion 71 is fixed to the stepped portion 31b by welding and is electrically connected to the cap plate 31, and the variable portion 72 is bonded to the first current collecting member 43 by welding.

The variable portion 72 includes the supporting protrusion 73, which protrudes towards the first current collecting member 43, and the supporting protrusion 73 is fitted into the supporting hole 43d formed in the first current collecting member 43.

The first current collecting member 43 is provided with the supporting plate 76, which is bonded to the supporting protrusion 73, and the supporting plate 76 is provided to cover the supporting hole 43d from below.

The connection member 70 is positioned between the cap plate 31 and the first current collecting member 43, and the supporting plate 76 is positioned between the first current collecting member 43 and the electrode assembly 10.

The supporting plate 76 is formed in a circular plate shape and is formed with a notch 76a.

The notch 76a is formed with a groove elongated along a circumferential direction of the supporting hole 43d.

The supporting plate 76 is bonded to the supporting protrusion 73 by welding, and the notch 76a is configured to rupture if the internal pressure of the rechargeable battery 104 is increased, to have the connection member 70 inversely deformed, thereby separating the connection member 70 from the first current collecting member 43.

In the present embodiment, if the notch 76a is formed to be ruptured when the internal pressure is increased, a predetermined pressure to separate the connection member 70 from the first current collecting member 43 may be more easily set.

When the connection member 70 and the first current collecting member 43 are only bonded by welding, the pressure varies depending on the welding quality, and it is very difficult to precisely set the pressure level that cuts off the current.

However, because the notch 76a may be symmetrical, it is possible to precisely set the pressure at which the connection member 70 and the first current collecting member 43 are separated.

Figure 9:
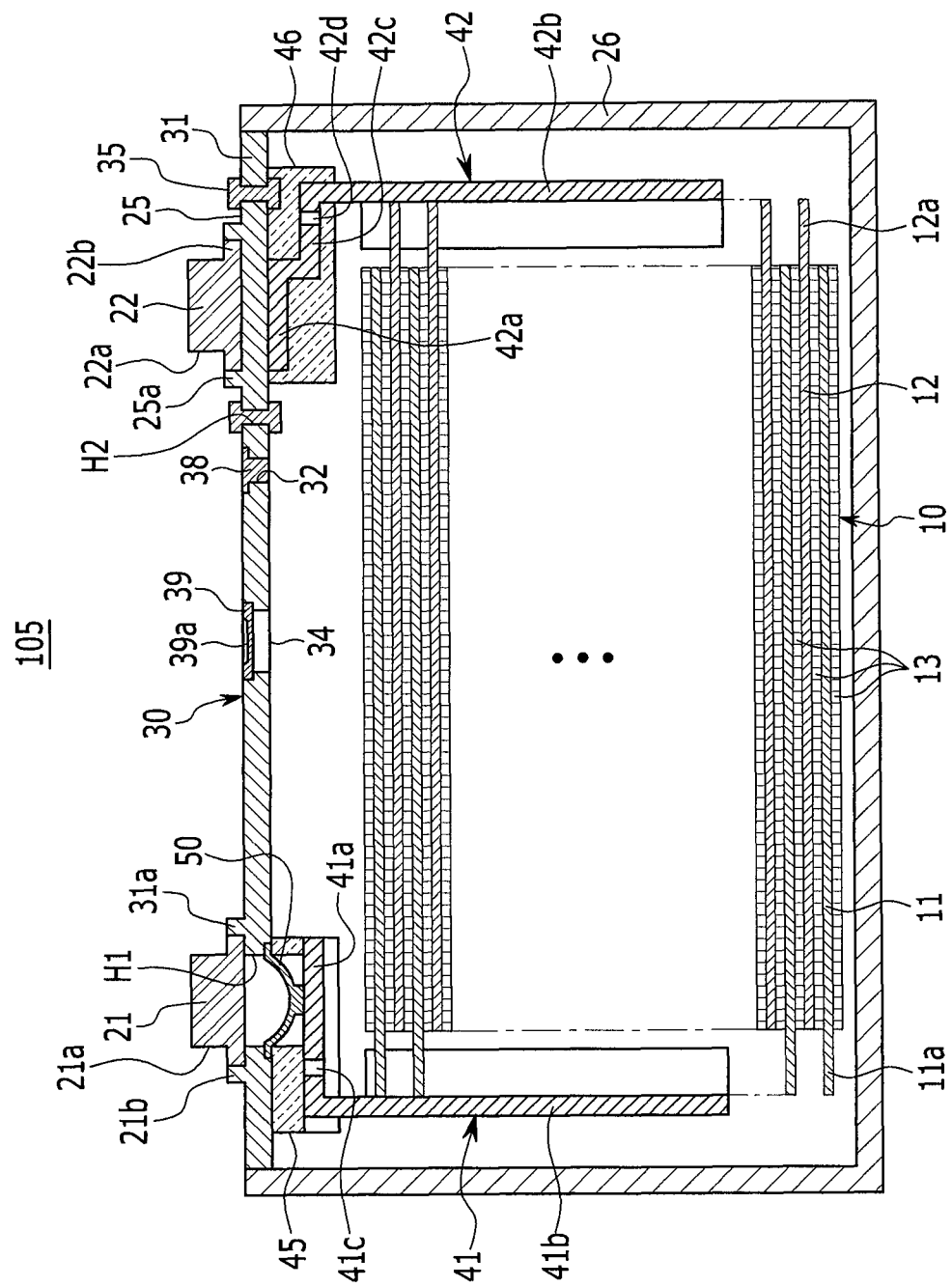
FIG. 9 is a vertical cross-sectional view of a rechargeable battery according to a fifth exemplary embodiment of the present invention.
Figure 10:
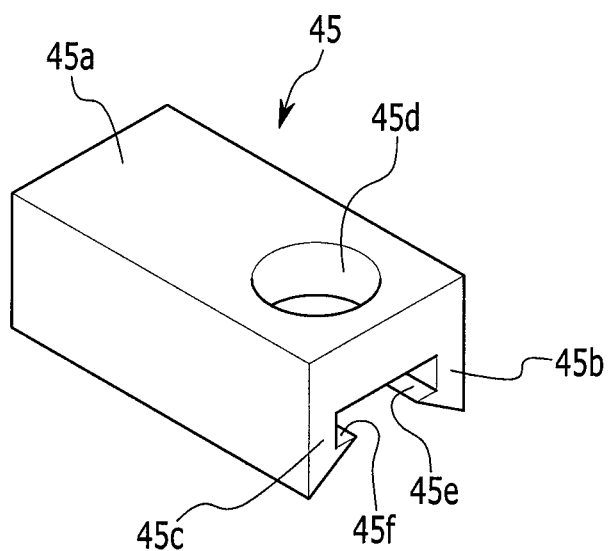
FIG. 10 is a perspective view of a first lower insulation member of the rechargeable battery according to the fifth exemplary embodiment of the present invention.
Figure 11:
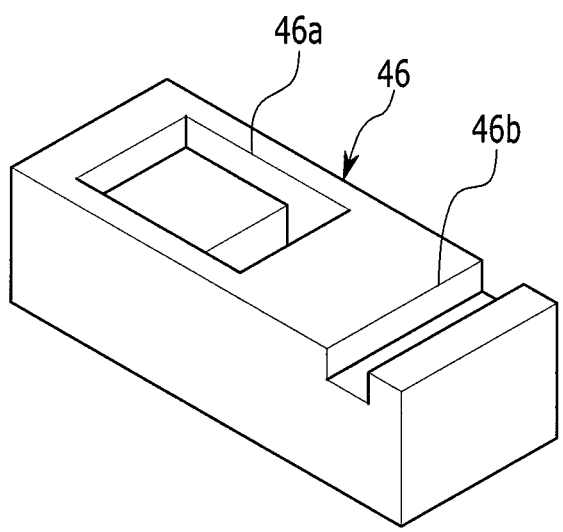
FIG. 11 is a perspective view of a second lower insulation member of the rechargeable battery according to the fifth exemplary embodiment of the present invention.

FIG. 9 is a vertical cross-sectional view of a rechargeable battery according to a fifth exemplary embodiment of the present invention, FIG. 10 is a perspective view of a first lower insulation member according to the fifth exemplary embodiment of the present invention, and FIG. 11 is a perspective view of a second lower insulation member according to the fifth exemplary embodiment of the present invention.

Referring to FIG. 9 to FIG. 11, since the rechargeable battery 105 according to the present exemplary embodiment has the same structure as the rechargeable battery according to the first exemplary embodiment, except for first and second lower insulation members 45 and 46, a repeated description of the same structure will not be provided again.

The first lower insulation member 45 is positioned between the first current collecting member 41 and the cap plate 31, and the second lower insulation member 46 is positioned between the second current collecting member 42 and the cap plate 31.

The first and second lower insulation members 45 and 46 are made of a polymer material having an insulating property.

The first lower insulation member 45 includes a top side 45a located between the cap plate 31 and the upper bonding portion 41a, two lateral sides 45b and 45c protruding downwards from respective lateral ends of the top side 45a, and supporting steps 45e and 45f protruding inwards from respective lateral sides 45b and 45c.

The top side 45a is formed in a quadrangular plate shape, and is configured to contact a top side of the upper bonding portion 41a.

The top side 45a is fixed to the cap plate 31 by an adhesive or by other methods, and is formed with a connecting hole 45d, in which the connection member 50 is inserted.

The connecting hole 45d is located at a lower part of the connection hole H1 and is connected thereto, and the variable portion 52 of the connection member 50 is inserted into the connecting hole 45d.

The supporting steps 45e and 45f contact a bottom side of the upper bonding portion 41a, and support the upper bonding portion 41a.

The first lower insulation member 45 prevents the first current collecting member 41 from moving downwards due to impacts and vibrations.

In one embodiment, the first lower insulation member 45 prevents the current collecting member 41 from moving upwards along with the connection member 50, when the connection member 50 is inversely deformed.

In the embodiments where the first lower insulation member 45 is not included, if the connection member 50 is abruptly deformed, the first current collecting member 41 may be separated from the connection member 50 without moving upwards. However, if the connection member 50 is slowly deformed, the first current collecting member 41 may move upwards along with the connection member 50.

In this case, separation of the connection member 50 and the first current collecting member 41 may be delayed, and the rechargeable battery may explode.

However, according to the present exemplary embodiment, since the first lower insulation member 45 supports the first current collecting member 41 from above, the first current collecting member 41 is prevented from moving towards the cap plate 31.

In one embodiment, the second lower insulation member 46 is provided to enclose an upper part of the second current collecting member 42.

The second lower insulation member 46 is formed by insert molding, may be bonded to the second current collecting member 42, and is configured to be fixed to the cap plate 31.

The second lower insulation member 46 is provided to enclose the upper bonding portion 42a and the intermediate connecting portion 42c of the second current collecting member 42.

The second lower insulation member 46 is provided with a space 46a, in which an upper end of the second current collecting member 42 is inserted, and a groove 46b, in which a lower end of the upper insulation member 35 is inserted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 101, 102, 103, 104, 105: rechargeable battery
10: electrode assembly 11: positive electrode
12: negative electrode 13: separator
21: first terminal 22: second terminal
21a, 22a: protrusion portion 21b, 22b: flange portion
25: supporting member 25a, 31a: mounting protrusion
26: case 30: cap assembly
31: cap plate 31b: stepped portion
35: upper insulation member 41, 43: first current collecting member
42: second current collecting member 41a, 42a, 43a: upper bonding portion
41b, 42b, 43b: electrode bonding portion 41c, 42d, 43c: fuse hole
42c: intermediate connecting portion 43d: supporting hole
45: first lower insulation member 45a: top side
45b, 45c: lateral side 45d: connecting hole
45e, 45f: supporting step 46: second lower insulation member
46a: space 46b: groove
50, 60, 70: connection member 51, 61, 71: edge portion
52, 62, 72: variable portion 53, 73: supporting protrusion
76: supporting plate 76a: notch

What is claimed is:

1. A rechargeable battery comprising:
    an electrode assembly comprising a first electrode and a first current collecting member bonded to the first electrode;
    a second electrode;
    a case accommodating the electrode assembly;
    a cap plate coupled to the case; and
    a connection member electrically connecting the first electrode and the cap plate through the first current collecting member, wherein the connection member comprises a supporting protrusion integrally protruding from a surface of the connection member and wherein the connection member is configured to sever an electrical connection between the first electrode and the cap plate, and
    wherein the first current collecting member is formed with a supporting hole into which the supporting protrusion is accommodated by an interference fit.

2. The rechargeable battery of claim 1, wherein the first current collecting member comprises an electrode bonding portion bonded to the first electrode, and an upper bonding portion connected to the electrode bonding portion and bonded to the connection member.

3. The rechargeable battery of claim 1, wherein the first current collecting member has a fuse hole.

4. The rechargeable battery of claim 1, wherein the cap plate is formed with a connection hole, and the connection member is located between the connection hole and the first current collecting member.

5. The rechargeable battery of claim 4, wherein a stepped portion is formed at an edge of the connection hole, and wherein the connection member comprises an edge portion inserted into the stepped portion and a variable portion central to the edge portion, convexly curved towards the first current collecting member, and bonded to the first current collecting member.

6. The rechargeable battery of claim 4, wherein the cap plate comprises a first terminal electrically connected to the cap plate, and wherein the first terminal covers the connection hole.

7. The rechargeable battery of claim 1, wherein the supporting protrusion is bonded to the first current collecting member.

8. The rechargeable battery of claim 1, wherein the supporting protrusion penetrates the supporting hole, and wherein a supporting plate is welded to the supporting protrusion at an edge of the supporting protrusion.

9. The rechargeable battery of claim 8, wherein the supporting plate comprises a notch elongated in a circumferential direction of the supporting hole.

10. The rechargeable battery of claim 1, wherein a first lower insulation member is located between the cap plate and the first current collecting member, and wherein the first lower insulation member comprises a connecting hole into which the connection member is configured to be inserted.

11. The rechargeable battery of claim 10, wherein a supporting step is formed in the first lower insulation member.

12. The rechargeable battery of claim 1, wherein the cap plate further comprises a supporting member; a second terminal electrically connected to the second electrode through the supporting member, and an upper insulation member between the supporting member and the cap plate.

13. The rechargeable battery of claim 12, wherein a second current collecting member is connected to the second electrode and is bonded to the bottom side of the supporting member.

14. The rechargeable battery of claim 13, wherein the second current collecting member has a fuse hole.

15. The rechargeable battery of claim 14, wherein the second current collecting member further comprises a second lower insulation member enclosing the fuse hole.

* * * * *